UNITED STATES PATENT OFFICE.

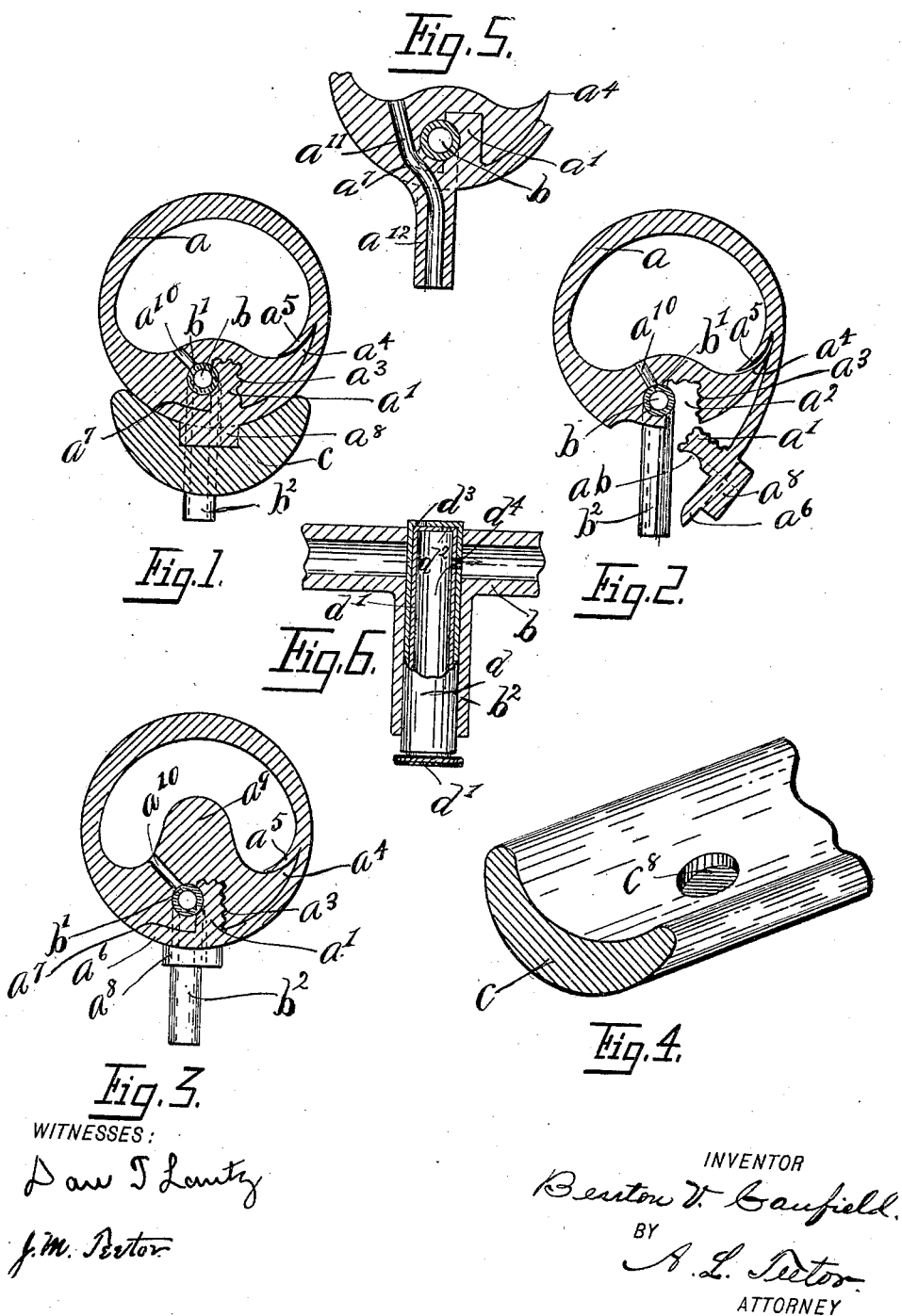

BENTON V. CANFIELD, OF INDIANAPOLIS, INDIANA.

INFLATABLE TIRE.

SPECIFICATION forming part of Letters Patent No. 676,733, dated June 18, 1901.

Application filed October 4, 1900. Serial No. 32,062. (No model.)

*To all whom it may concern:*

Be it known that I, BENTON V. CANFIELD, a citizen of the United States, residing at Indianapolis, in the county of Marion and State of Indiana, have invented certain new and useful Improvements in Single-Tube Inflatable Tires, of which the following is a specification.

My invention relates to improvements in single-tube inflatable tires; and one object is to provide a single-tube tire that is suitable for an ordinary crescent rim and to be retained and prevented from slipping thereon without the use of cementing processes in common use, and another object being to provide facilities for easy repairing of punctures from the inside, another object being to provide means whereby injury to the rim and tire is prevented when the tire becomes punctured and it is desired to ride home without stopping to repair the tire on the way. I attain these objects by means and construction illustrated in the accompanying drawings, in which—

Figure 1 is a cross-section of the complete tire and the rim on which it is mounted. Fig. 2 is a detached view in cross-section of the tire, showing the sealing and locking sections separated at the point where they lock together.
Fig. 3 shows the tire closed preparatory to being mounted on the rim. Fig. 4 is a perspective view of a section of the rim. Fig. 5 is a broken section showing the independent air-duct. Fig. 6 represents a three-way valve which may be used in one form or construction of my device.

$a$ represents the main body of the tire.

$b$ represents the sealing-tube.

$c$ is the rim of the wheel.

$a'$ is an annular flange or tongue adapted to engage with the annular groove $a^2$, both being corrugated at contact-surfaces seen at $a^3$.

$a^4$ is an annular feather-edge of the base or rim side of the tire or thickened part toward the rim. $a^5$ is a projecting annular lip flange or keeper under which the said feather-edge $a^4$ is projected and held down when in operation. The outside overlapping section of sheath $a^6$, projecting from $a^5$ to $a^7$, is placed in position shown in Fig. 3 preparatory to placing on the wheel-rim $c$ and is provided on the surface resting in the rim with a series of stops or bosses $a^8$, which may be in any desired form, as round, transverse, or diagonal ribs, and corresponding recesses $c^8$ in suitable series in the rim adapted to engage with said stops, whereby is prevented the creeping of the tire.

$b$ represents an annular sealing-tube, preferably being cemented to or made part of and with the thickened portion at the rim side and projecting into the annular groove $a^2$ at one side thereof, where it is adapted to be engaged with the annular recesses $a^b$ in the annular tongue-flange $a'$. The sealing-tube $b$ is provided, preferably, with a short valve-tube $b^2$, communicating with the tube $b$ and adapted by a screw-valve or other suitable means for the attachment of the common tire-pump whereby air is compressed into the tire. The tube $b$ has one or more incisions made through its inner wall at $b'$ at points provided with suitable air-ducts $a^{10}$ through said thickened section, conducting air from sealing-tube passing through said incisions $b'$ to tire. The outwardly-projecting annular ridge $a^9$ provides support when by accident the tire becomes flat to prevent injury to the rim when being ridden in an exhausted condition, said central ridge being of any suitable proportions.

$a^{11}$ is an independent air-duct with the valve-stem $a^{12}$ provided, to which is attached any ordinary valve-and-pump connection for the inflation of the tire independently of the inflation of the sealing-tube $b$ shown in the other figures, in which case the sealing-tube is not provided with incisions or air-outlets to the tire proper. $d$ is a three-way valve which may be used in the sealing-tube $b$, held in the stem $b^2$ and extending through the tube with its port $d^3$, which is adapted to communicate directly with the air-duct $a^{10}$ and in which arrangement the sealing-tube $b$ is not provided with aforesaid incisions, so that it may be inflated first and independently when the port $d^4$ of said valve is open, and whereafter the rotatable member $d'$ may be turned so that the openings $d^3$ and $d^3$ coincide, so that said port $d^3$ admits air through the air-duct $a^{10}$ into the tire, and port $d^4$ to sealing-tube is closed, and for further security against leakage I place a valve in duct $a^{10}$.

The latter two forms of construction provide the retention in sealing-tube of an air-pressure independent from that of the tire, so that the binding force to the rim is not so much affected by low pressure in the tire as where the tire and sealing-tube are inflated in common, as is the case with the construction shown in Figs. 1, 2, and 3.

In the application and use of my device the tire is closed, as shown at Fig. 3, and mounted, as seen at Fig. 1, and air-pressure pumped into it by way of a pump or other means connected with the tube $b^2$, whereby is inflated first the tube $b$ within its recess $a^b$ in the tongue $a'$, so that its dilation for the purpose of sealing is accomplished before the incisions $b'$ are spread to admit the passage of air into the interior of the tire proper, when the interlocking and overlapping parts of the tire become compressed upon each other, whereby the tire is drawn firmly down upon the rim and securely held, or, if the tire is of the construction shown in Fig. 5, the sealing-tube is first inflated, and then the tire is inflated independently of and after the sealing-tube is inflated.

I am aware that many changes in form or proportion of parts and in details of construction of my device here shown may be resorted to by a mechanic skilled in the art without departing from the spirit and scope of my invention, and I would have it understood that I reserve the right to make all modifications in my device in its application as may fall fairly within such scope.

Having described and shown my invention, what I claim as new, and desire to secure by Letters Patent, is—

1. In a single-tube inflatable tire, a sheath forming the tire, overlapping edges of said sheath overlapping at the seat of said tire, one edge pressing inside of the other, means for locking said overlapping edges and a sealing-tube between said overlapping sections as set forth.

2. In a single-tube, inflatable tire formed of a sheath continuous over the outer or tread side and overlapping on inner or seat side, an annular groove or recess formed in inside lap, an annular tongue-flange formed on outside lap adapted to engage with said groove in inside lap, a sealing-tube embedded in said groove and an annular recess at one side of said tongue adjacent to said sealing-tube, all combined to operate as set forth.

3. In a single-tube inflatable tire formed of a sheath or wall continuous at the tread and overlapping at the seat or rim side of tire, a thickened section near the edge of the inside lap, a longitudinal annular groove formed in said thickened section, a longitudinal annular tongue adapted to enter said groove, corrugations on the impinging surfaces of said groove and tongue on one side thereof, a recess in said groove at side opposite from said corrugations, a sealing-tube fixed in said recess and a corresponding recess in said tongue opposite to recess in said groove and a sealing-tube in said groove adapted to be dilated by the pressure of air within the tire pressing against the said groove on one side and against the tongue on the opposite side, whereby the corrugated impinging surfaces of said groove and tongue are pressed firmly together thereby sealing against leakage of air, all substantially as set forth.

4. In a single-tube inflatable tire, a sheath overlapping at under or rim side of said tire, a groove and tongue provided on respective edges of said sheath, the outer lap preferably being provided with the tongue and the inner lap with the said groove, a thickened longitudinal section provided on inner lap terminating in a feather-edge, a lip or hook flange provided on inner side of tire-wall, projecting inwardly and downwardly and adapted to catch over said feather-edge to prevent said thickened section from raising up when the air-pressure is pumped into the sealing-tube, substantially as specified.

5. In a single-tube inflatable tire, a sheath separable at its seat side by overlapping edges, a thickened section at inner lap, a central enlarged annular ridge formed on the thickened section to render cushioning effect when air-pressure is low in tire, a tongue and a groove provided respectively on overlapping edges adapted to engage with each other to lock said edges together and a sealing-tube embedded between adjacent sides of said tongue and groove, as set forth.

6. In a single-tube inflatable tire, a sheath separable at its seat side by overlapping edges, a tongue and groove provided respectively on said overlapping edges adapted to engage with each other to lock said sides together, a sealing-tube embedded between adjacent sides of said tongue and groove, incisions in walls of said sealing-tube and air ducts or passages communicating from said incisions to air-chamber of tire, as set forth.

7. In a single-tube inflatable tire, a sheath separable at its seat by overlapping sides, a thickened section at inner lap, a central annular enlarged ridge formed on thickened section to render cushioning effect when air-pressure is low in tire, a tongue and groove provided respectively on overlapping sides adapted to engage with each other to lock said sides together, a sealing-tube embedded between adjacent sides of said tongue and groove, incisions in walls of said sealing-tube and air ducts or passages communicating from said incisions to air-chamber of tire, substantially as set forth.

8. In a single-tube inflatable tire the combination with a sheath having separable overlapping sides, a tongue and groove provided on respective laps adapted to interlock with each other as shown, a sealing-tube provided within said groove adapted to dilate by pressure of the air due to inflation of tire, a series of bosses or stops fixed on tire at rim side thereof and a rim provided with a series of recesses adapted to engage with said stops to prevent the tire from creeping on said rim; substantially as specified.

9. In a single-tube inflatable tire, a tire formed of a single sheath separable at the rim side one edge overlapping the other, one being thickened, an annular groove provided in thickened section thereof and an annular tongue provided in the other overlapping edge adapted to engage with said groove whereby the said edges of said sheath are locked together, an annular sealing-tube embedded in said groove and adapted by inflation to press against the side of said groove and the tongue and thereby to seal against leakage of air and an air inlet or duct provided in said tire, whereby air may be conducted into the tire all combined as set forth.

10. In a single-tube inflatable tire the combination with a sheath forming the tire being continuous over the tread and overlapping the edges thereof at rim or seat side, a tongue and groove provided on respective edges overlapping, a sealing-tube located so as to coact with said tongue and groove, and provided with stem for attachment of valve and pump for the inflation thereof, and an air-duct and valve-stem provided and communicating with the tire independently of said sealing-tube, substantially as set forth.

11. In a single-tube inflatable tire formed of a sheath overlapping at rim or seat side, a tongue and groove provided in respective overlapping sides adapted to engage and lock said sides together, a sealing-tube mounted in said groove between the adjacent slack surfaces of said tongue and groove and adapted to press them tightly together and means for inflating the sealing-tube and the tire independently of each other, as specified.

12. In a single-tube inflatable tire formed of a sheath overlapping at rim or seat side, a tongue and groove provided on overlapping sides, a sealing-tube provided between slack sides of said tongue and groove, a three-way valve provided in said sealing-tube adjustable to two positions, whereby inflating-air may be first delivered to said sealing-tube and next to the tire proper; substantially as set forth.

In testimony that I claim the foregoing as my invention I subscribe my name hereto, in the presence of witnesses, this 20th day of August, 1900.

BENTON V. CANFIELD.

Witnesses:
G. R. CANFIELD,
A. L. TEETOR.